United States Patent
Chen

(10) Patent No.: US 7,989,747 B2
(45) Date of Patent: Aug. 2, 2011

(54) PROJECTOR HAVING A CONTROLLED RECHARGEABLE CELL AND HEAT DISSIPATION SYSTEM OF THE PROJECTOR FOR COOL DOWN AFTER POWER OFF

(75) Inventor: Sheng-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 667 days.

(21) Appl. No.: 12/122,537

(22) Filed: May 16, 2008

(65) Prior Publication Data

US 2009/0059178 A1    Mar. 5, 2009

(30) Foreign Application Priority Data

Aug. 31, 2007  (CN) .......................... 2007 1 0201553

(51) Int. Cl.
*G01J 1/32*  (2006.01)
(52) U.S. Cl. ..................... 250/205; 250/214 R
(58) Field of Classification Search .................. 250/239, 250/238, 214 R, 205; 353/52, 57, 54; 352/202
See application file for complete search history.

(56) References Cited

U.S. PATENT DOCUMENTS 6,472,828 B1  10/2002  Pruett et al.
6,588,907 B1 *  7/2003  Billington et al. .............. 353/57

FOREIGN PATENT DOCUMENTS

| CN | 1570758 A | 1/2005 |
|---|---|---|
| CN | 1873522 A | 12/2006 |
| CN | 1928707 A | 3/2007 |

\* cited by examiner

*Primary Examiner* — Que T Le
(74) *Attorney, Agent, or Firm* — Andrew C. Cheng

(57) ABSTRACT

An exemplary projector includes a power supply circuit, a heat dissipation device, a rechargeable cell and a first switching circuit connected between the heat dissipation device and the rechargeable cell. The heat dissipation device is configured for dissipating heat produced by the projector. The power supply circuit is configured for powering the heat dissipation device. The rechargeable cell is configured for receiving and storing electrical power from the power supply circuit. The first switching circuit is configured for controlling the rechargeable cell to power the heat dissipation device when the power supply circuit stops powering the heat dissipation device. A related heat dissipation system is also provided.

18 Claims, 3 Drawing Sheets

PROJECTOR HAVING A CONTROLLED RECHARGEABLE CELL AND HEAT DISSIPATION SYSTEM OF THE PROJECTOR FOR COOL DOWN AFTER POWER OFF

BACKGROUND

1. Field of the Invention

The present invention relates to projectors, and particularly to a heat dissipation system for a projector.

2. Description of Related Art

Projectors are widely used for conference room presentations, classroom training, and home theater applications. Generally, in order to satisfy high luminance requirements, high-powered light sources are usually employed by the projector. During operation, the high-powered light source produces sufficient heat to burn or cause damage to the projector (e.g. a lens system in the projector and the light source itself). Therefore, heat dissipation systems are required to prevent the operating projectors from overheating. A heat dissipation system including at least one heat dissipation device (a fan, a heat sink, or a heat pipe for example) can effectively dissipate heat produced by the light source in the projector during operation. However, the remaining heat in the projector when it is powered off may cause damage and shorten service life of the projector.

Therefore, an improved projector and a heat dissipation system of the projector are needed to address the aforementioned deficiency and inadequacies.

SUMMARY

An exemplary projector includes a power supply circuit, a heat dissipation device, a rechargeable cell, and a first switching circuit connected between the heat dissipation device and the rechargeable cell. The heat dissipation device is configured for dissipating heat produced by the projector. The power supply circuit is configured for powering the heat dissipation device. The rechargeable cell is configured for receiving and storing electrical power from the power supply circuit. The first switching circuit is configured for controlling the rechargeable cell to power the heat dissipation device when the power supply circuit stops powering the heat dissipation device.

Other advantages and novel features of the present invention will become more apparent from the following detailed description of an embodiment/embodiments when taken in conjunction with the accompanying drawings, in which:

DETAILED DESCRIPTION

References will now be made to the drawings to describe the exemplary embodiments of the present projector and the heat dissipation system of the projector.

Figure 1:
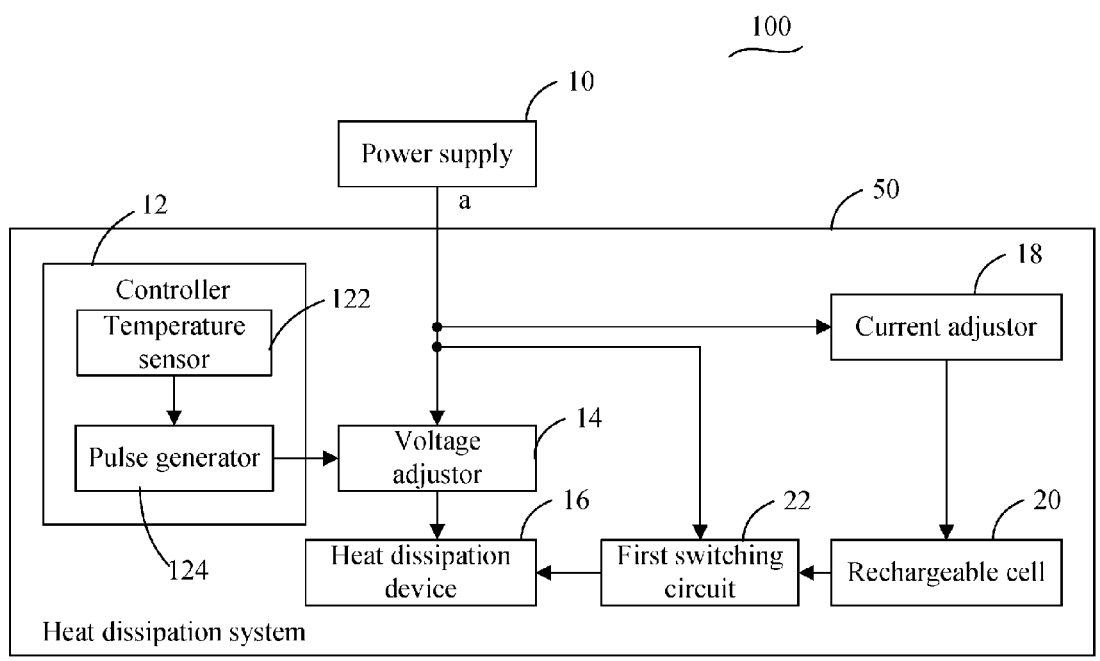
FIG. 1 is a schematic block diagram of a projector in accordance with a first exemplary embodiment, the projector including a heat dissipation system.

Referring to FIG. 1, in a first exemplary embodiment, a projector 100 includes a heat dissipation system 50 and a power supply circuit 10 for powering the heat dissipation system 50. In the exemplary embodiment, the power supply circuit 10 is a converter connected to an alternating current (AC) power source to receive an AC voltage. The power supply circuit 10 converts the AC voltage into a first direct current (DC) voltage, 12.5 volts for example. An output terminal of the power supply circuit 10 is labeled "a" in FIG. 1.

The heat dissipation system 50 is configured for dissipating heat produced by the projector 100. The heat dissipation system 50 can continue operating for a predetermined time after the power supply circuit 10 stops powering the heat dissipation system 50 to dissipate heat remaining in the projector 100.

The heat dissipation system 50 includes a controller 12, a voltage adjustor 14, a heat dissipation device 16, a current adjustor 18, a rechargeable cell 20, and a first switching circuit 22.

The heat dissipation device 16 can be a fan, or a blower for producing a current of air to take the heat out of the projector 100. Understandably, a heat pipe can be used together with the fan or the blower for heat dissipation. The heat dissipation device 16 can be powered by the power supply circuit 10 via the voltage adjustor 14, and the rechargeable cell 20 via the first switching circuit 22. When the power supply circuit 10 outputs the first DC voltage, the heat dissipation device 16 is powered by the power supply circuit 10. When the power supply circuit 10 is turned off, e.g. if a plug of the projector 100 is pulled out of the AC power source, the rechargeable cell 20 powers the heat dissipation device 16 for a predetermined amount of time.

The controller 12 is coupled to the voltage adjustor 14 for generating a voltage adjustment signal to control the amount of power the voltage adjustor 14 outputs to the heat dissipation device 16. In the exemplary embodiment, the controller 12 generates the voltage adjustment signal according to a temperature of the projector 100. The controller 12 includes a temperature sensor 122 and a pulse generator 124. The temperature sensor 122 is configured in the projector 100 to detect the temperature of the projector 100 and correspondingly generate an electric signal. The pulse generator 124 is used for generating a pulse-width modulation (PWM) signal (namely, the voltage adjustment signal) according to the electric signal. The PWM signal is simply a pulse having a controllable pulse width. The PWM signal is a rectangular wave including a high voltage (such as 5 volts) and a low voltage (such as 0 volts). The width of the pulse is characterized by a duty cycle. The duty cycle is a proportion of time during which the pulse remains high.

In the exemplary embodiment, when the temperature of the projector 100 is higher than a predetermined value, the pulse generator 124 is enabled and outputs a PWM signal with a predetermined duty cycle. The duty cycle increases in response to an increase of the temperature of the projector 100.

The voltage adjustor 14 is used for receiving the first DC voltage, and outputting a second DC voltage according to the voltage adjustment signal (the PWM signal in the exemplary embodiment). In the exemplary embodiment, the voltage adjustor 14 is enabled when the PWM signal is high, and disabled when the PWM signal is low. As a result, operation of the heat dissipation device 16 is adjusted by the controller 12 according to the temperature of the projector 100.

The rechargeable cell 20 is used for receiving electrical power from the power supply circuit 10, and storing the electrical power when the power supply circuit 10 is turned on. The rechargeable cell 20 is connected to the heat dissipation device 16 via the first switching circuit 16, and supplies power to the heat dissipation device 16 when the power supply circuit 10 is turned off. The rechargeable cell 20 may be composed of a plurality of capacitors connected in series with each other, or one or more batteries. In the exemplary embodiment, the rechargeable cell 20 is composed of a plurality of high capacity capacitors. The high capacity capacitors may be electric double layer capacitors.

At the start of recharging the cell 20, a recharging current is always very large, which may affect other elements in the projector 100. The current adjustor 18 is connected to the rechargeable cell 20 for adjusting the current flowing from the power supply circuit 10 to the rechargeable cell 20 while recharging, so as to limit the recharging current.

The first switching circuit 22 is configured for detecting electrical signals, or lack thereof, on the output terminal "a" of the power supply circuit 10, and enabling the rechargeable cell 20 to power the heat dissipation device 16 when the power supply circuit 10 stops powering the heat dissipation device 16. In detail, the first switching circuit 22 establishes a first connection between the rechargeable cell 20 and the heat dissipation device 16 when detecting there is no output at the terminal "a". Thus, the remaining heat in the projector 100 can be dissipated. The first switching circuit 22 cuts off the first connection when detecting there is an output at the output terminal "a" of the power supply circuit 10.

In conclusion, when the power supply circuit 10 has an output, the rechargeable cell 20 starts to recharge. Due to the current adjustor 18, not all of the current outputted by the power supply circuit 10 flows to the rechargeable cell 20. When the power supply circuit 10 has no output, the first switching circuit 22 establishes the first connection. The rechargeable cell 20 starts to discharge and powers the heat dissipation device 16 until the cell 20 runs out of power. The number and capacity of the capacitors comprised by the cell 20 determine how long the cell 20 can power the heat dissipation device 16. The heat dissipation device 16 dissipates the remaining heat in the projector 100.

In other embodiments, the controller 12 and the voltage adjustor 14 can be omitted. The heat dissipation device 16 is powered directly by the power supply circuit 10 when the power supply circuit 10 has an output. In other embodiments, the temperature sensor 122 can be omitted; the pulse generator 124 generates the PWM signal according to a predetermined configuration.

Figure 2:
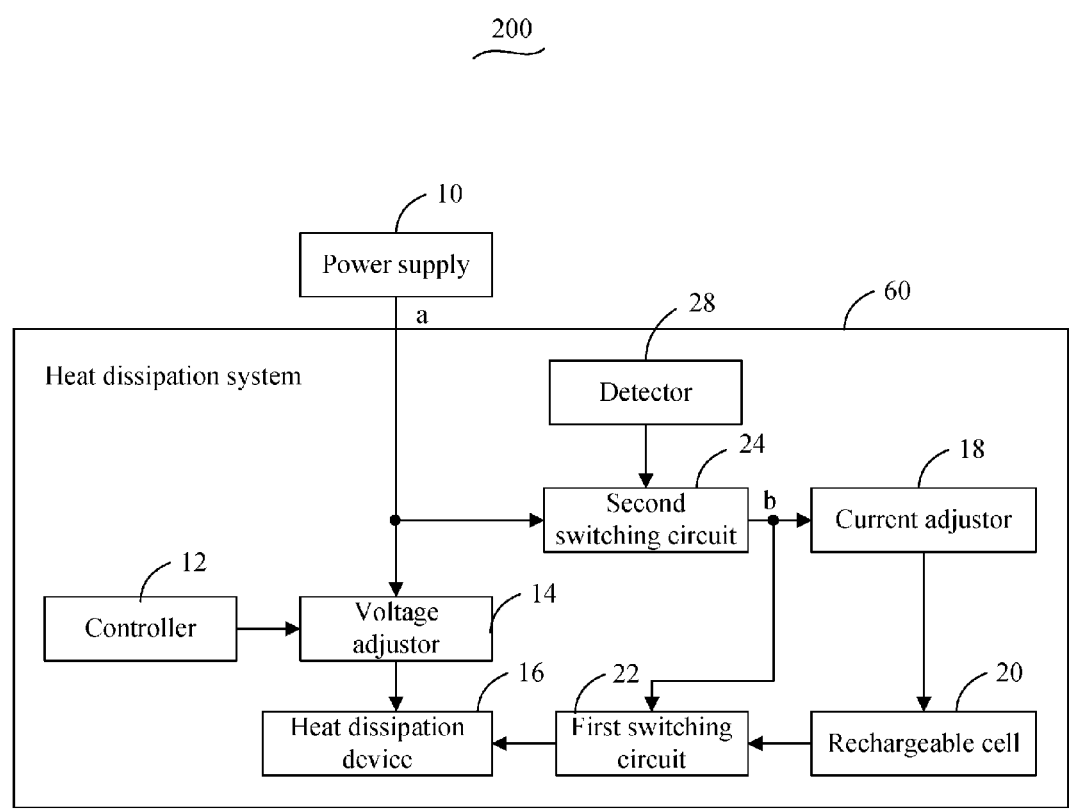
FIG. 2 is a schematic block diagram of a projector in accordance with a second exemplary embodiment, the projector including a heat dissipation system.

Referring to FIG. 2, in a second exemplary embodiment, a projector 200 includes a heat dissipation system 60, and the same power supply circuit 10 as in the first exemplary embodiment. The power supply circuit 10 is used for powering the projector 200. The heat dissipation system 60 includes the same controller 12, the voltage adjustor 14, the heat dissipation device 16, the current adjustor 18, the rechargeable cell 20, and the first switching circuit 22 as in the first exemplary embodiment. The heat dissipation system 60 further includes a second switching circuit 24 and a detector 28.

In the second exemplary embodiment, the voltage adjustor 14 is connected to the controller 12, the power supply circuit 10, and the heat dissipation device 16. The second switching circuit 24 is connected to the power supply circuit 10, the detector 28, the first switching circuit 22, and the current adjustor 18, which is also connected to the rechargeable cell 20. The first switching circuit 22 is also connected to the rechargeable cell 20 and the heat dissipation device 16.

In the embodiment, the first switching circuit 22 is connected to an output terminal "b" of the second switching circuit 24. The first switching circuit 22 establishes the first connection when detecting there is no output at the output terminal "b" of the second switching circuit 24, and cuts off the first connection when detecting there is an output at the output terminal "b".

The detector 28 is used for detecting a state of the projector 200 (i.e. whether the projector 200 is powered on), outputting a recharge signal (5 volts, for example) when the projector 200 is powered on, and outputting a discharge signal (0 volts, for example) when the projector 200 is powered off. In the exemplary embodiment, the detector 28 is connected to a power switch of the projector 200.

The second switching circuit 24 is configured for establishing a second connection between the power supply circuit 10 and the current adjustor 18 when receiving the recharge signal. When the second connection is established, the second switching circuit 24 transmits the first DC voltage to the current adjustor 18, signifying that the rechargeable cell 20 is recharging, and the first connection is cut off. The second switching circuit 24 is further configured for disconnecting the second connection when receiving the discharge signal, or when the power supply circuit 10 stops powering the heat dissipation system 60. When the second connection is disconnected/cut off, the rechargeable cell 20 discharges and powers the heat dissipation device 16.

Figure 3:
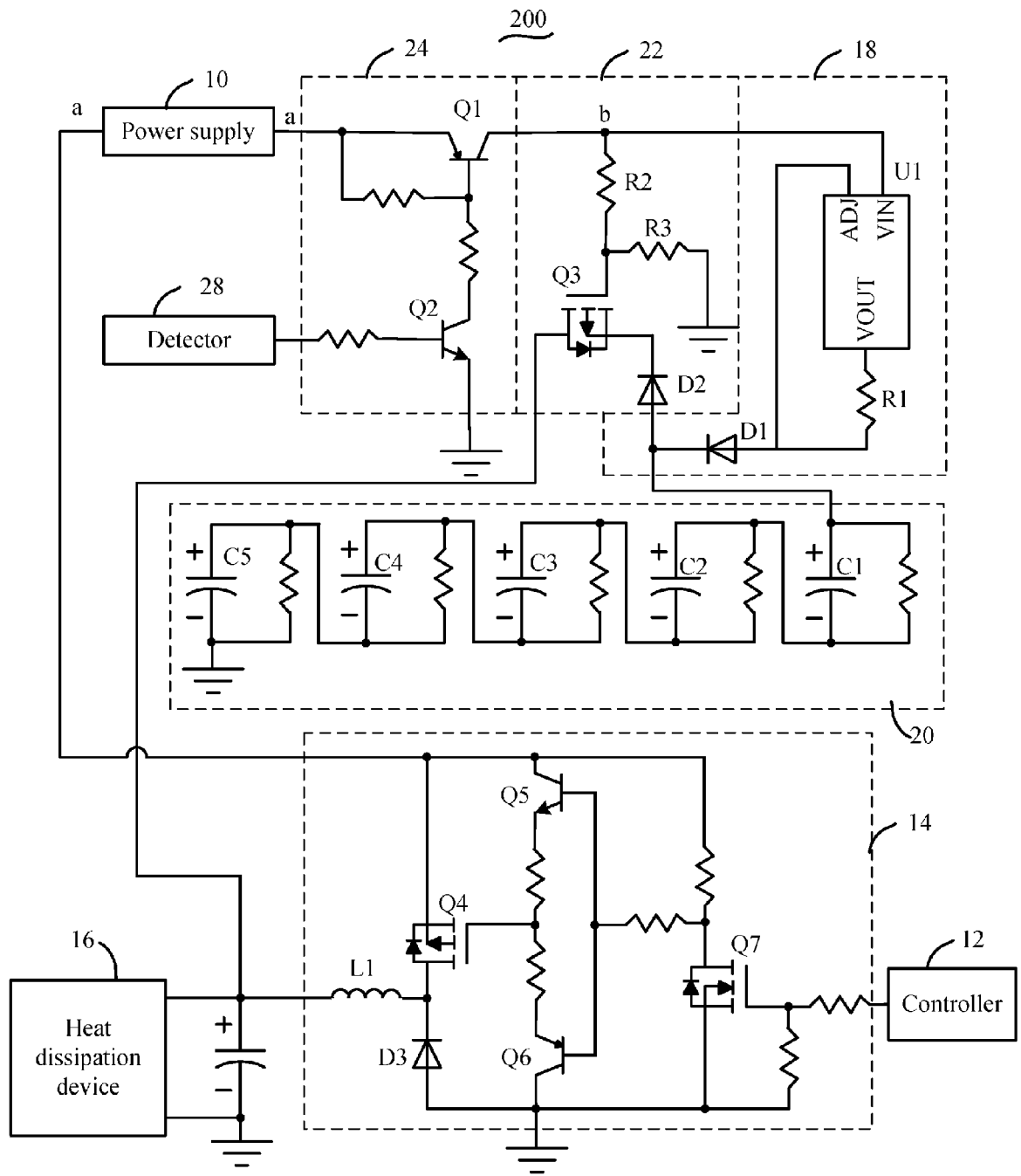
FIG. 3 is a schematic diagram showing a structure of the heat dissipation system of FIG. 2.

Referring also to FIG. 3, a schematic diagram of a structure of the projector 200 from FIG. 2 is shown. The rechargeable cell 20 includes a number of electric double layer capacitors (C1, C2, C3, C4, and C5) connected in series. An anode of the capacitor C1 is connected to the current adjustor 18, and a cathode of the capacitor C5 is grounded. Rated voltage of the capacitors C1, C2, C3, C4, and C5 is 2.5 volts (V). Therefore, a rated voltage of the rechargeable cell 20 should be 12.5V. Five resistors (not labeled) are respectively connected to the capacitors C1, C2, C3, C4, and C5 in parallel for balancing equivalent resistances of the capacitors C1, C2, C3, C4, and C5.

The second switching circuit 24 includes two switches Q1, Q2, and three resistors (not labeled). The switch Q1 is a PNP type bipolar junction transistor (BJT), and the switch Q2 is an NPN type BJT. The emitter of the switch Q1 is connected to the power supply circuit 10, and the base thereof via a resistor. The base of the switch Q1 is connected to the collector of the switch Q2 via a resistor. The collector of the switch Q1, as the output terminal "b", is connected to the first switching circuit 22 and the current adjustor 18. The base of the switch Q2 is connected to the detector 28 via a resistor. The emitter of the switch Q2 is grounded. When the detector 28 outputs a high voltage, the switch Q2 turns on. As a result, the switch Q1 is turned on, and outputs a 12.5V voltage. The rechargeable cell 20 is recharged. When the detector 28 outputs a low voltage, the switch Q2 turns off, thus the switch Q1 turns off. When no voltage is provided to the terminal "a", the switch Q1 turns off as well. Accordingly, there is no output at the terminal "b".

The current adjustor 18 includes a 3-terminal positive adjustable regulator (regulator for short) U1, a resistor R1, and a diode D1. The input terminal of the regulator U1 is connected to the terminal "b". The adjusting terminal of the regulator U1 is connected to the anode of the diode D1. The output terminal of the regulator U1 is connected to the anode of the diode D1 via the resistor R1. The cathode of the diode D1 is connected to the rechargeable cell 20. The diode D1 is used for preventing an inverted current from flowing from the rechargeable cell 20 to the current adjustor 18. In the exemplary embodiment, the regulator U1 is configured for limiting the recharge current of the rechargeable cell 20 to within 0.2 amperes.

The first switching circuit 22 includes a switch Q3, two resistors R2, R3, and a diode D2. The switch Q3 is an N-Channel enhancement type field effect transistor (FET). The gate of the switch Q3 is grounded via the resistor R3, and connected to a terminal of the resistor R2. The drain of the switch Q3 is connected to the heat dissipation device 16. The source of the switch Q3 is connected to the cathode of the diode D2. The anode of the diode D2 is connected to the anode of the capacitor C1. Another terminal of the resistor R2 is connected to the terminal "b". When the terminal "b" is provided with a high voltage (12.5V), the switch Q3 turns off, the first connection is cut off, and the rechargeable cell 20 is recharged. When the terminal "b" is grounded, the switch Q3 turns on, and the rechargeable cell 20 discharges to power the heat dissipation device 16.

The voltage adjustor 14 includes a diode D3, an inductor L1, four switches Q4, Q5, Q6, Q7, and six resistors (not labeled). The switch Q4 is an N-Channel enhancement type FET. The switch Q7 is a P-Channel enhancement type FET. The switch Q5 is an NPN type BJT. The switch Q6 is a PNP type BJT. The source of the switch Q4 is connected to the terminal "a". The drain of the switch Q4 is connected to a terminal of the inductor L1 and the cathode of the diode D3. The gate of the switch Q4 is respectively connected to the emitters of the switches Q5 and Q6 via respective resistors. Another terminal of the inductor L1 is connected to the heat dissipation device 16. The anode of the diode D3 is grounded. The collector of the switch Q5 is connected to the terminal "a", and the base of the switch Q5 is connected to the drain of the switch Q7 via a resistor. The collector of the switch Q6 is grounded, and the base of the switch Q6 is connected to the base of the switch Q5. The drain of the switch Q7 is connected to the terminal "a" via a resistor, the source of the switch Q7 is grounded, and the gate of the switch Q7 is grounded via a resistor. The gate of the switch Q7 is also connected to the controller 12 via a resistor, for receiving the PWM signal. When the controller 12 outputs a high voltage, the switch Q7 turns on, the switch Q6 turns on, and the switch Q5 turns off. The gate of the switch Q4 is grounded. Accordingly, the switch Q4 turns on and outputs the 12.5V voltage to the heat dissipation device 16. The heat dissipation device 16 starts to work. When the controller 12 outputs a low voltage, the switch Q7 turns off, the switch Q6 turns off, and the switch Q5 turns on. A voltage supplied to the gate of the switch Q4 is about 12.5V, thus, the switch Q4 turns off. Due to the inductor L1, a part of current is outputted to the heat dissipation device 16, which allows it to continue functioning for a certain period of time.

In conclusion, when the projector 200 is powered on, and the power supply circuit 10 has an output, the detector 28 controls the second switching circuit 24 to establish the second connection. The rechargeable cell 20 starts to recharge, while a light source on the projector 200 starts warming up. Due to the current adjustor 18, not all of the current outputted by the power supply circuit 10 flows through the rechargeable cell 20. When the projector 200 is powered off (at this time, the controller 12 disables the voltage adjustor 14), or a power supplied to the power supply circuit 10 is cut off, the second switching circuit 24 cuts off the second connection. As a result, the first switching circuit 22 establishes the first connection. The rechargeable cell 20 starts to discharge and powers the heat dissipation device 16. The heat dissipation device 16 dissipates the remaining heat in the projector 200, and the service life of the projector 200 can be maintained normally.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projector, comprising:
   a heat dissipation device for dissipating heat produced by the projector;
   a power supply circuit for powering the heat dissipation device;
   a rechargeable cell for receiving and storing electrical power from the power supply circuit;
   a first switching circuit connected between the heat dissipation device and the rechargeable cell for controlling the rechargeable cell to power the heat dissipation device when the power supply circuit stops powering the heat dissipation device;
   a detector for detecting an on-and-off state of the projector, outputting a recharge signal when the projector is powered on, and outputting a discharge signal when the projector is powered off; and
   a second switching circuit for establishing a connection between the power supply circuit and the rechargeable cell when receiving the recharge signal, and cutting off the connection when receiving the discharge signal, or when the power supply circuit stops supplying the electrical power;
   wherein the first switching circuit is further configured for controlling the rechargeable cell to power the heat dissipation device when the connection is cut off.

2. The projector as described in claim 1, further comprising a current adjustor for adjusting a current flowing from the power supply circuit to the rechargeable cell.

3. The projector as described in claim 2, wherein the current adjustor comprises:
   a 3-terminal positive adjustable regulator comprising an input terminal, an adjusting terminal, and an output terminal, the input terminal connected to the power supply circuit;
   a first diode, an anode of the first diode connected to the adjusting terminal of the 3-terminal positive adjustable regulator, and a cathode of the first diode connected to the rechargeable cell; and
   a first resistor connected from the output terminal of the 3-terminal positive adjustable regulator to the anode of the first diode.

4. The projector as described in claim 1, further comprising:
   a controller for generating a voltage adjustment signal; and
   a voltage adjustor, connected between the power supply circuit and the heat dissipation device, for receiving the electrical power from the power supply circuit and supplying a first voltage to the heat dissipation device according to the voltage adjustment signal.

5. The projector as described in claim 4, wherein the controller comprises a pulse generator, and the voltage adjustment signal is a pulse-width modulation signal.

6. The projector as described in claim 5, wherein the controller further comprises a temperature sensor for measuring a temperature of the projector, and correspondingly generating a second voltage; wherein the controller generates the pulse-width modulation signal according to the second voltage.

7. The projector as described in claim 1, wherein the rechargeable cell comprises a plurality of capacitors connected in series with each other.

8. The projector as described in claim 7, wherein the capacitors are electric double layer capacitors.

9. The projector as described in claim 8, further comprising a plurality of resistors respectively connected to the plurality of capacitors in parallel.

10. A heat dissipation system for dissipating heat of a projector, the heat dissipation system comprising:
a heat dissipation device for dissipating heat;
a rechargeable cell for receiving electrical power from a power supply circuit and storing the electrical power;
a first switching circuit for controlling the rechargeable cell to power the heat dissipation device when the power supply circuit is cut off;
a detector for detecting an on-and-off state of the projector, outputting a recharge signal when the projector is powered on, and outputting a discharge signal when the projector is powered off; and
a second switching circuit for establishing a connection between the power supply circuit and the rechargeable cell when receiving the recharge signal, and disconnecting the connection when receiving the discharge signal, or when the power supply circuit stops supplying the electrical power;
wherein the first switching circuit is further configured for controlling the rechargeable cell to power the heat dissipation device when the connection is disconnected.

11. The heat dissipation system as claimed in claim 10, wherein the rechargeable cell comprises a plurality of capacitors connected in series with each other.

12. The heat dissipation system as described in claim 11, wherein the capacitors are electric double layer capacitors.

13. The heat dissipation system as described in claim 11, further comprising a plurality of resistors respectively connected to the plurality of capacitors in parallel.

14. The heat dissipation system as described in claim 12, further comprising a current adjustor for limiting a current flowing from the power supply circuit to the rechargeable cell.

15. The heat dissipation system as described in claim 10, further comprising:
a controller for generating a voltage adjustment signal; and
a voltage adjustor, connected between the power supply circuit and the heat dissipation device, for receiving the electrical power and supplying a first voltage to the heat dissipation device according to the voltage adjustment signal.

16. The heat dissipation system as described in claim 10, wherein the heat dissipation device comprises a fan for producing a current of air to take the heat out of the projector.

17. The heat dissipation system as described in claim 16, wherein the heat dissipation device further comprises a heat pipe used with the fan for heat dissipation.

18. The heat dissipation system as described in claim 10, wherein the rechargeable cell comprises at least one battery.

* * * * *